United States Patent [19]
Gotz

[11] 3,973,478
[45] Aug. 10, 1976

[54] AIR DEFLECTION FOR SLIDING ROOFS OF MOTOR VEHICLES
[75] Inventor: Hans Götz, Boblingen, Germany
[73] Assignee: Daimler-Benz Aktiengesellschaft, Stuttgart, Germany
[22] Filed: Aug. 2, 1974
[21] Appl. No.: 494,744

[30] Foreign Application Priority Data
Aug. 4, 1973  Germany............................ 2339680

[52] U.S. Cl............................. 98/2.14; 296/137 J; 296/137 D
[51] Int. Cl.²......................................... B60H 1/26
[58] Field of Search ............. 98/2, 2.11, 2.12, 2.14, 98/2.15; 296/137 J, 137 D, 137 E, 137 F, 137 C, 91

[56]  References Cited
UNITED STATES PATENTS
1,893,350   1/1933   Austin............................. 296/137 D
3,156,175   11/1964  Werner................................ 98/2.14
3,203,727   8/1965   Werner............................ 296/137 J
3,368,841   2/1968   Grau................................. 296/137 J
3,507,537   4/1970   Kouth et al...................... 296/137 F
3,843,195   10/1974  Lidington............................ 98/2.14
3,922,032   11/1975  Schaller.............................. 98/2.14

FOREIGN PATENTS OR APPLICATIONS
184,834    2/1956   Germany........................ 296/137 J
534,498    10/1955  Italy............................... 296/137 E
304,583    6/1952   Switzerland..................... 296/137 J
980,012    1/1965   United Kingdom.............. 296/137 J Primary Examiner—John J. Camby
Assistant Examiner—Henry C. Yuen
Attorney, Agent, or Firm—Craig & Antonelli

[57]  ABSTRACT

An air deflection structure for sliding roofs of motor vehicles which is constituted by an air foil profile pivotally arranged underneath the sliding roof in the vehicle cross direction within the forward area of the sliding roof; the air foil profile extends in its pivoted-up operating position under a negative angle of attack of about 5° to about 30° and projects only slightly beyond the roof contour in its operating position.

7 Claims, 2 Drawing Figures

U.S. Patent   Aug. 10, 1976   3,973,478
FIG. 1
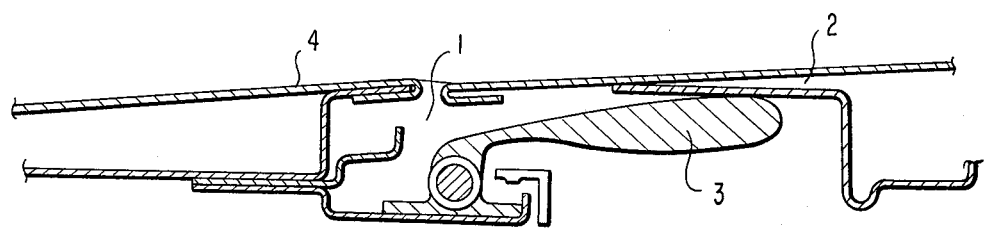
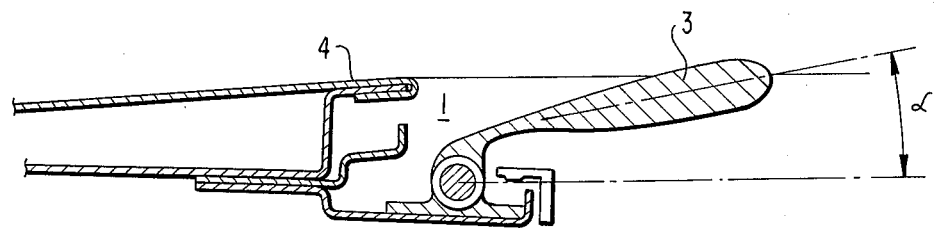
FIG. 2

AIR DEFLECTION FOR SLIDING ROOFS OF MOTOR VEHICLES

The present invention relates to an air deflector for sliding roofs of motor vehicles which is constituted by an air guide profile pivotally arranged underneath the sliding roof in the vehicle transverse direction within the forward area of the sliding roof opening.

Such air deflectors are intended to reduce disturbing air noises occurring during the drive as well as to protect the air present within the vehicle interior space against oscillations disagreeable to the passengers.

Known air deflectors which are constructed generally as relatively thin sheet metal or synthetic plastic parts that inherently already have again a tendency for oscillations or vibrations are, however, not in the position to fulfill these requirements in an optimum manner.

In particular one does not succeed with the prior art air deflectors to prevent the generation of air noises at high driving velocities.

The present invention is therefore concerned with the task to avoid these disadvantages of known air deflectors and to provide an air deflector which, by reason of its arrangement and configuration, fulfills completely satisfactorily all requirements made thereof and which nonetheless requires practically no increased structural expenditures as compared to the known constructions.

The underlying problems are solved according to the present invention in that the air deflector is constituted by an air-foil profile arranged with its thicker section toward the rear, i.e., with its area of large cross-sectional surface disposed downstream, as viewed in the direction of flow, which extends in its pivoted-up operating position under a negative angle of attack of about 5° to about 30°.

It has been discovered to be particularly advantageous if the air deflector in its operating position projects upwardly beyond the roof contour only by about 3 to about 6 mm. so that the air resistance of the vehicle is only insignificantly influenced by the same.

The construction as air-foil profile, the small angle of attack as well as the recessed arrangement of the air deflector according to the present invention favor the flow deceleration and the pressure increase on its top side, as well as an unstable, partially sudden shifting of the point of separation in the flow separation area at the rear edge of the air deflector, from which results a "soft" noise-free circumcirculation of the air deflector.

Accordingly, it is an object of the present invention to provide an air deflector for sliding roofs of motor vehicles which avoids by simple means the aforementioned shortcomings and drawbacks encountered in the prior art.

Another object of the present invention resides in an air deflector for sliding roofs of motor vehicles which effectively avoids disturbing air noises and disagreeable vibrations of the air in the vehicle interior space.

A further object of the present invention resides in an air deflection structure which does not possess an inherent tendency to vibrate and is able to fulfill all requirements optimally.

Still a further object of the present invention resides in an air deflection structure for sliding roofs of motor vehicles which not only precludes air noises at high driving velocities but in practice does not involve any structural increased expenditures as compared to the prior art structures.

Still a further object of the present invention resides in an air deflector of the type described above which does not significantly influence the air resistance of the vehicle and therewith the streamlining thereof, yet favors the flow deceleration and pressure increase on its top side.

These and further objects, features and advantages of the present invention will become more apparent from the following description when taken in connection with the accompanying drawings which shows, for purposes of illustration only, one embodiment in accordance with the present invention, and wherein:

FIG. 1 is a somewhat schematic longitudinal cross-sectional view through the forward area of the sliding roof section of a motor vehicle with a closed sliding roof and with an air deflector according to the present invention which is pivoted downwardly in its normal rest position; and FIG. 2 is a somewhat schematic longitudinal cross-sectional view corresponding to FIG. 1, however, with an opened sliding roof and with the air deflector pivoted up into its operating position.

Referring now to the drawing wherein like reference numerals are used throughout the two views to designate like parts, in the embodiment of the present invention illustrated in the drawing, an air deflector 3 is pivotally supported underneath the sliding roof 2 within the forward area of the sliding roof opening 1. The air deflector 3 is thereby constituted by an air foil profile arranged with its thicker section toward the rear, i.e., with its larger air foil surface having a larger cross-sectional thickness arranged to the rear in relation to the pivot axis, i.e., downstream in the flow direction, which in its operating position illustrated in FIG. 2 extends under a negative angle of attack $\alpha$ and projects upwardly beyond the roof contour 4 only by a few millimeters. The angle $\alpha$ is preferably between about 5° to about 30° while the extent of the projection of the air deflector 3 beyond the roof contour amounts in the operating position preferably to about 3 mm. to about 6 mm. only. Prior to the closing of the sliding roof 2, the air deflector 3 is pivoted downwardly into its normal rest position illustrated in FIG. 1 of the drawing. Conventional means are used to effect the pivoting movement of the air deflector 3. These means may be of any conventional type, i.e., mechanical, electrical, etc., forming no part of the present invention and therefore not illustrated herein for the sake of simplicity. In its simplest form, the means may be formed by a manual pivotability operating against a friction force effective in the pivot bearing or on the pivot shaft.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An air deflection structure for sliding roofs of motor vehicles which includes air deflector means having a front portion and a rear portion, said front portion being pivotally arranged underneath the sliding roof in a vehicle cross direction, characterized in that said air deflector means includes an air foil means having a profiled air foil cross section with a thicker air foil cross section in the rear portion of said air deflector means for effecting noise-free air flow around said air deflector means at high air flow velocities, said air deflector means being pivoted up into an operating position to extend under a negative angle of attack of about 5° to about 30° with respect to the roof contour.

2. An air deflection structure according to claim 1, characterized in that the air deflector means is pivotally arranged within the forward area of the opening of the sliding roof, and with respect to its pivot axis, said air deflector means extends rearwardly upwardly into the opening of the sliding roof in the pivoted-up operating position.

3. An air deflection structure according to claim 2, characterized in that the air deflector means, in said operating position, projects upwardly only slightly beyond the roof contour.

4. An air deflection structure according to claim 3, characterized in that the air deflector means in said operating position projects upwardly beyond the roof contour only about 3 to about 6 mm.

5. An air deflection structure according to claim 1, characterized in that the air deflector means, in said operating position, projects upwardly only slightly beyond the roof contour.

6. An air deflection structure according to claim 1, characterized in that the air deflector means in said operating position projects upwardly beyond the roof contour only about 3 to about 6 mm.

7. An air deflection structure according to claim 1, characterized in that said profiled air foil cross section provides air flow deceleration and pressure increase on the top side of said air deflector means, and said profiled air foil cross section provides an unstable, shifting air flow separation point at the rear edge of said air deflector means.

\* \* \* \* \*